March 23, 1943. A. DREYER 2,314,611
METHOD AND APPARATUS FOR MAKING FLEXIBLE TUBING
Filed Aug. 26, 1939
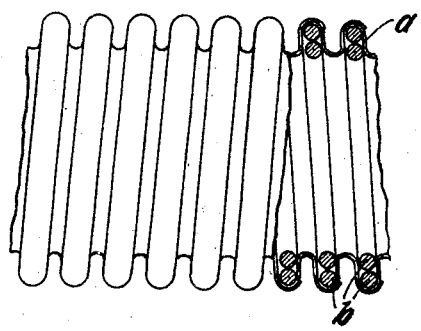
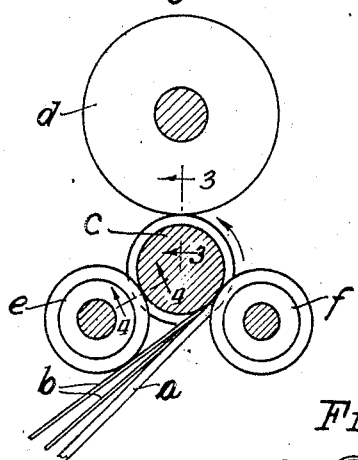
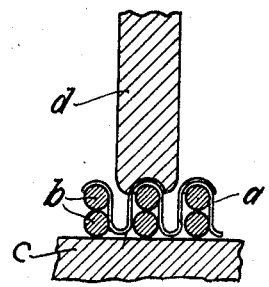
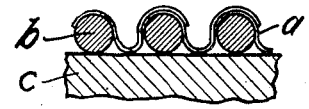
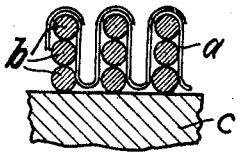
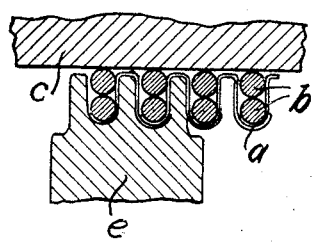
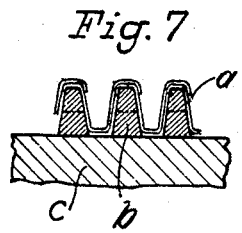
Inventor:
Albert Dreyer
By:- Cox & Moore
Attys.

Patented Mar. 23, 1943

2,314,611

UNITED STATES PATENT OFFICE 2,314,611

METHOD AND APPARATUS FOR MAKING FLEXIBLE TUBING

Albert Dreyer, Lucerne, Switzerland

Application August 26, 1939, Serial No. 292,124
In Switzerland March 20, 1939

19 Claims. (Cl. 219—6)

This invention relates to methods and apparatus for making flexible metal hose or tubing.

It is an object of the invention to provide improved methods and apparatus for manufacturing flexible metal hose or tubing, particularly of the type wherein a suitably profiled strip is spirally wound upon an arbor so that the edges of the strip are brought into overlapping relation, said edges being thereafter welded to form the completed flexible tubing construction.

Further objects of the invention are to provide in connection with the production of flexible tubing of the foregoing type, an improved and simplified arbor construction which can be produced at a lower cost and which will have increased life in service; means for maintaining the completed tubing at all times of predetermined size or gauge; means for maintaining an improved welding contact between the over lapped edges of the strip to be welded; and improved means for facilitating the removal of the tubing from the arbor after the completion of the welding operation, such means being operable without the aid of calibrating or loosening rollers, or other special tools or devices.

Stated generally, the invention contemplates the provision of separate or separable means, such as metal wires or the like, within the profiled convolutions of the strip, either before or as an incident to the winding operation, the strip and such separable means being adapted to be suitably wound upon a smooth arbor by means of which the welding operation is effected. After welding, the separable means may be permitted to remain within the convolutions of the tubing or removed therefrom as desired.

It is accordingly a still further object of the invention to provide simplified methods and apparatus for producing convoluted metallic tubing having reinforcing or packing means, such as metal wires or the like, arranged within the tubing convolutions.

Another object is to provide an improved form of wire packed flexible tubing, as above defined.

Still other objects, advantages and features of the invention will be apparent from the following specification when taken in connection with the accompanying drawing wherein certain preferred embodiments of the invention are illustrated.

In the drawing, wherein like reference characters refer to like parts throughout:

Fig. 1 is a general assembly view showing a piece of convoluted flexible metal tubing or hose formed in accordance with the principles of the invention, a part of the tubing being cut away or sectionalized to show the nature of the construction.

Fig. 2 is a view, somewhat diagrammatic in form, illustrating the method and apparatus by which the tubing, as shown in Fig. 1, may be formed.

Fig. 3 is a partial, sectional view of the apparatus of Fig. 2 on an enlarged scale and on the line 3—3 of Fig. 2.

Fig. 4 is a similar partial or detail sectional view of the apparatus shown in Fig. 2 on the line 4—4 thereof, and Figs. 5, 6 and 7 are detail views similar to Fig. 3, but illustrating modified forms of construction.

One method by which convoluted flexible tubing may be formed is by winding a suitably profiled strip spirally upon a similarly profiled arbor or the like, the edges of the strip being brought into overlapping relation preferably at the crest portions of the convolutions so that they may be welded together to form the completed tubing. Such a method for forming tubing is disclosed in my copending application, Serial No. 302,308, filed November 1, 1939, and entitled Method and apparatus for making flexible metal tubing, now issued as Patent No. 2,273,027. In accordance with this method of tubing production, the profiled projection on the arbor, which is in the nature of a spiral or helical screw thread, serves as a reaction base for the overlapping strip edges. The arbor projection underlies the overlapping edges supporting them and serving, together with the arbor, as an inner electrode for the welded joint. An outer electrode, such as an electrode roller or wheel, is moved progressively along the spiral seam formed by the overlapped strip edges, to effect the welding operation by means of electrical resistance welding.

The foregoing method and apparatus constitute a material improvement over heretofore known methods and apparatus and may be used satisfactorily and successfully to produce highly flexible metallic tubing or hose; but in certain instances such method and apparatus are subject to manufacturing disadvantages which are overcome by the present invention and improvements. For example, due to the fact that the arbor, and more particularly the spiral projection thereof, acts as an electrode during the welding process, the arbor projection is subjected to wear and deterioration which is avoided in accordance with the present invention. During the welding process the incurred heats of 700 to 1000 degrees C.

tend to deform the projection on the arbor at the welding points tending to wear or deteriorate the same, and the pressure which is exerted on the arbor projection by the outer electrode or roller aggravates this condition of wear and deterioration. It has been found that even the use of especially resistant electrode materials for the arbor does not wholly eliminate the wear and deterioration in question. The present invention avoids these difficulties. Further, the arbor with its specially formed spiral projection is more difficult and expensive to produce. It is not necessary that the arbor projection be completely worn or deteriorated to render the arbor unfit for use, for when the projection becomes worn or gets smaller a substantial amount, a smaller or undersize tubing will be formed. Such wear, thus resulting in the production of undersize tubing, renders the arbor unsatisfactory, as undersize tubing leads to difficulties in the assembly of couplings and other attachment parts on the tubing. In other words, couplings and tubing attachment parts are accurately machined or formed to predetermined size, and the tubing for cooperation therewith must likewise be maintained at an accurate and predetermined size.

A further difficulty encountered in the manufacture of tubing by means of a profiled arbor, as compared with the methods proposed by the present invention, lies in the comparative difficulty of removing the tubing from the arbor after the completion of the welding operation. The presence of the helical arbor projection necessitates the removal of the tubing by the helical unscrewing of the same. If the helical projection on the arbor is made of sufficient height and size to act as a firm reaction base for the overlapped tubing edges during the welding process, thereby securing a satisfactory welded joint, the projection may be of such size that it will bind the tubing convolutions and prevent ready removal of the tubing from the arbor after the welding operation has been completed. On the other hand, if the arbor projection is made materially smaller than the profiled cross section of the strip, the projection will not serve as a satisfactory inner welding electrode and an unsatisfactory weld will result. To facilitate the removal of the completed tubing when using a profiled arbor, while retaining the arbor projection of maximum size, calibrating rollers or the like may be used to compress or slightly reform the tubing corrugations after the welding operation so as to loosen them from a profiling on the arbor. In accordance with the present invention, however, such special tools and special processing operations are eliminated.

The present invention constitutes an improvement over the foregoing methods. Referring more specifically to the drawings, and first to Figs. 1 to 5 thereof, it will be seen that in accordance with the present invention as the profiled metal strip *a* is spirally wound onto the arbor *c* and brought into engagement with the electrode roller *d* (Fig. 2), separable devices and more particularly metal wires *b* are simultaneously wound onto the arbor within the profiled contour of the metal strip. Accordingly, as will be best understood by reference to Fig. 3, the arbor *c* may have its exterior surface of plain cylindrical form, the provision of profiling or helical projections thereon being eliminated. The metal strip *a* and the wires *b* may be led onto the arbor, as shown in Fig. 2, from any suitable source of supply such as supply rolls or the like. Obviously the wires can be arranged within the profiling of the strip prior to the time the strip is wound upon the arbor, but it is preferred to arrange the wires within the strip simultaneously with the winding of the strip upon the arbor in the interest of economy and simplicity. The metal strip *a* could, in certain instances, be profiled by its contact with the wires *b*, as an incident to the winding operation, but in the particular embodiment illustrated it is preferred to profile the strip by separate suitable means, such as by progressive profiling rollers or the like, engageable with the strip as it approaches the arbor to be wound thereon as illustrated in Fig. 2.

As also best shown in Fig. 3 as the strip *a* is spirally wound upon the arbor, the edges of the strip which are brought into overlapping relation, are overlapped at the top or crest of the corrugations, the wires *b* being arranged directly thereunder. Accordingly as the overlapped edges are engaged by the welding roller *d* at the welding station, the wires form as a firm reaction base for the overlapped strip edges maintaining the edges in position, and the wires also serve as an inner electrode to effect the welding operation. The electrode roller *d* is formed of suitable electrode material such as copper or copper alloy and is adapted to be connected to one branch of a suitable welding transformer or the like (not shown). The arbor *c* is adapted to be connected to the other branch of the welding transformer, and the arbor together with the wires *b* will also be formed of suitable electrode material, such as copper, aluminum or other metals of good conductivity. Accordingly, as the arbor and the electrode roller are rotated, the metal strip *a* and the wires *b* are wound spirally upon the arbor and drawn progressively into engagement with the electrode roller, the electrode roller thus moving progressively along the seam formed by the overlapped strip edges. Current passes between the electrode roller and the wires *b* to the arbor *c* through the overlapped strip edges at the welding station, the overlapped strip edges being thus effectively welded by electrical resistance welding.

As best shown in Fig. 4, the guiding roller *e* which engages the welded strip as it leaves the welding station is provided with projecting ribs adapted to engage within the profiling of the strip, or between the corrugations of the tubing, in such a manner as to maintain the wires *b* in the proper position within the strip convolutions and insure the proper formation of the tubing corrugations. Preferably the guiding roller *f* which engages the strip as the wires *b* are initially assembled therein and before the strip and wires reach the welding station is similarly formed and for a similar purpose. It is to be understood that while one portion of the guiding roller *f* serves to engage the strip prior to the welding thereof, other portions of the guiding roller engage the strip after the welding operation and as the strip leaves the guiding roller *e*. In other words, the same strip section will be engaged several times by the guiding rollers *f* and *e* before such strip portion finally leaves the welding apparatus and its associated guiding mechanism whereby to insure the accurate convoluting or corrugating of the tubing. In this connection it is also to be noted that the welding roller *d* is provided with suitable shaping on its outer peripheral surface whereby to maintain the strip and associated wires in proper position at the welding station.

Due to the use of the smooth cylindrical welding arbor c, the cost of the original production of the arbor is greatly diminished over the cost of producing an arbor with projecting ribs or profiling. Also it is to be noted that it is the outer wire b rather than the arbor itself which is in engagement with the overlapped tubing edges at the welding station. Accordingly the wear and deterioration affects, due to the welding heat and pressure, are applied to the wire rather than to the arbor, materially increasing the life of the arbor and insuring that it will be constantly maintained at a proper size and diameter. This insures the continued production of an accurately sized tubing. The wires may be made sufficiently large to completely fill the interior convolutions of the strip and thus provide an adequate inside electrode at the welding station, but at the same time due to the fact that the wires are not formed as a part of the arbor, the completed welded tube with the wires arranged therein may be easily removed from the arbor by a relatively longitudinal sliding motion between the arbor and the completed tubing. The wires b, which completely fill the interior tubing convolutions, not only thereby insure the production of a proper weld by insuring proper contact between the strip edges and the welding roller d, but the wires also, by completely filling the interior profiling of the strip, insure that the strip will not be distored from the proper contour at the welding station. The strip is maintained of proper contour and the completed tubing with the wires therein may be readily removed from the arbor without the use of any calibrating or loosening rollers, or other special removal tools.

The wires may be left within the convolutions of the tubing, or removed therefrom as may be desired. In convoluted or corrugated tubing of the type disclosed, the substantial flexing of the tubing to impart flexibility thereto occurs in the trough portions of the corrugations. The presence of the wires arranged internally of the convolutions in no way impairs this flexing action and accordingly in no way impairs the flexibility of the composite tubing. However, the wires do add body and strength to the tubing, and also due to the fact that they fill up the tubing convolutions, tend to smooth out the interior tubing surfaces, thereby reducing resistance and facilitating fluid flow through the tubing in use. It is also to be noted that the overlapping of the strip edges occurs at the crest portions of the tubing convolutions. The trough portions are of single wall thickness imparting maximum flexibility. However, in certain instances it may be desirable to overlap and weld the strip edges at the trough or elsewhere along the convolution contour.

In instances where it is desired to remove the wire from the tubing convolutions, the wire can be reused a number of times, and when it becomes sufficiently worn or deteriorated so that it is no longer satisfactory, it can be readily and economically replaced.

In Figs. 5, 6 and 7 modified arrangements are illustrated. In Fig. 5 a single wire b of larger diameter is arranged within the tubing convolutions. With such an arrangement the insert wire may be more easily arranged and maintained in proper position. In Fig. 6 an arrangement is illustrated wherein three superposed wires are employed. Such an arrangement may be advantageously used where a particularly deeply corrugated tubing is desired. In Fig. 7 a wire insert b of trapezoidal cross section is illustrated. Such insert may either be made in the form of a single wire or as two wires, one superposed upon the other, and the outer wire being of somewhat smaller size, as illustrated. With such an arrangement the wire insert completely fills the inside of the tubing corrugations. Also, the wire insert is specially formed to conform to the shaping of the convolutions. It will be noted that in each instance the same cylindrical arbor c may be used to form the different shapes of tubing.

Various methods may be used for removing the tubing from the arbor, for example, the arbor may be relatively short, only three or four tubing convolutions in length, so that the tubing is automatically ejected therefrom as it is formed. The ease with which the tubing may be separated from the arbor in accordance with the present invention, facilitates this method of tubing manufacture. Alternatively the arbor may be made relatively long, and the tubing removed therefrom by periodic relative longitudinal motion between the tubing and the arbor, a short section of the tubing being allowed to remain on the arbor at the end of the removal operation for guiding purposes as tube forming operations are resumed. In the assemblies wherein the tubing is constantly ejected from a short arbor, there is no relative longitudinal motion between the arbor and the welding roller d, whereas in the arrangements wherein a longer arbor is used and tubing lengths periodically removed therefrom, slow relative longitudinal motion between the arbor and the welding and guiding rollers takes place during the welding operations. Obviously rotary motion may be imparted to the arbor and to the welding and guiding rollers by driving all or any number of these rotary members.

Various changes may be made in the specific embodiments of the invention set forth for purposes of illustration, and in the various method steps disclosed, without departing from the spirit of the invention. For example, two suitably profiled strips a may be superposed upon each other and spirally wound together with the wires b upon the arbor whereby to produce a double or multi-walled tubing. Accordingly the invention is not to be limited to the precise embodiments and method steps shown and described, but only as indicated in the following claims.

The invention is hereby claimed as follows:

1. The process of making flexible tubing which comprises winding a profiled elongated metal strip and an elongated wire assembly helically upon a smooth arbor with the edges of the strip in juxtaposed relation, the strip overlying the wire assembly and the wire assembly being shaped to conform to the profiling of the strip, and thereafter securing the juxtaposed strip edges together whereby to form the flexible tubing.

2. The process of making flexible tubing as defined in claim 1 wherein the juxtaposed strip edges are electrowelded, and wherein the arbor and the wire assembly constitute one of the welding electrodes.

3. The process of making flexible tubing which comprises winding an elongated metal strip and an elongated wire assembly helically upon an arbor with the edges of the strip in juxtaposed relation, the strip overlying the wire assembly, and electrowelding the juxtaposed strip edges using the wire assembly as one of the electrodes, whereby to form the flexible tubing.

4. The process of making flexible tubing as set forth in claim 3 wherein the juxtaposed strip edges are brought into overlapping relation in superposed position upon the wire assembly.

5. The process of making flexible tubing which comprises winding a profiled metal strip and an elongated wire assembly helically upon an arbor with the edges of the strip in overlapped relation, the overlapped strip edges being superposed upon the wire assembly and the wire assembly being shaped to conform to the profiling of the strip, and electrowelding the overlapped strip edges using the wire assembly as one of the electrodes, whereby to form the flexible tubing.

6. The process of making flexible tubing as defined in claim 5 wherein the arbor is of smooth cylindrical shape.

7. The process of making flexible tubing as defined in claim 5 wherein a welding roller is engaged with the strip exteriorly thereof, the periphery of the welding roller conforming to the profiling of the strip.

8. The process of making flexible tubing as defined in claim 1 wherein the wire assembly comprises a plurality of individual wires in superposed relation.

9. The process of making flexible tubing as defined in claim 5 wherein the wire assembly comprises a plurality of individual wires in superposed relation.

10. The process of making flexible tubing as defined in claim 1 wherein the strip and the wire assembly are removed as a unit from the arbor after the securing operation.

11. The process of making flexible tubing as defined in claim 3 wherein the arbor is of smooth cylindrical contour and wherein the strip and the wire assembly are removed as a unit therefrom after the welding operation.

12. The process of making flexible tubing as defined in claim 1 wherein the metal strip and the wire assembly are continuously removed from the smooth arbor during the securing operation.

13. The process of making flexible metal tubing as defined in claim 3 wherein the arbor is of smooth cylindrical contour and wherein the strip and the wire assembly are continuously removed therefrom during the welding operation.

14. The process of making flexible tubing as defined in claim 1 wherein the juxtaposed strip edges are brought into overlapping relation whereby to provide a helically extending overlapped strip seam.

15. Apparatus for making flexible tubing comprising a rotatable arbor, said arbor being of cylindrical shape, means for feeding an elongated metal strip to the arbor, means for feeding a wire to the arbor in juxtaposition to the metal strip, means for helically winding the strip and wire upon the arbor with the strip superposed upon the wire and with the edges of the strip in juxtaposed relation, and means including a rotatable welding roller engageable with the juxtaposed strip edges for welding said edges together to form the flexible tubing.

16. Apparatus for making flexible tubing comprising a rotatable arbor, said arbor being of smooth, cylindrical shape, means for feeding an elongated metal strip to the arbor, means for feeding a wire to the arbor in juxtaposition to the metal strip, means for helically winding the strip and wire upon the arbor with the strip superposed upon the wire and with the edges of the strip in juxtaposed relation, means including a rotatable welding roller engageable with the juxtaposed strip edges for welding said edges together to form the flexible tubing, and rotatable guiding rollers engageable with the strip on either side of the welding station, said guiding rollers including provisions for holding the strip and wire in proper juxtaposed position.

17. Apparatus as defined in claim 16 wherein means is provided for driving at least one of the rotatable members.

18. Apparatus for making flexible tubing comprising a rotatable arbor, said arbor being of smooth, cylindrical shape, means for feeding an elongated metal strip to the arbor, means for feeding a wire to the arbor in juxtaposition to the metal strip, means for helically winding the strip and wire upon the arbor with the strip superposed upon the wire and with the edges of the strip in juxtaposed relation, and means for securing the juxtaposed strip edges together to form the flexible tubing.

19. Apparatus for making flexible tubing as defined in claim 15, wherein the metal strip is profiled in cross section and wherein the peripheral surface of the welding roller is shaped to conform to the profiling of the strip.

ALBERT DREYER.